United States Patent [19]

Staplin et al.

[11] Patent Number: 5,150,468

[45] Date of Patent: Sep. 22, 1992

[54] STATE CONTROLLED INSTRUCTION LOGIC MANAGEMENT APPARATUS INCLUDED IN A PIPELINED PROCESSING UNIT

[75] Inventors: Deborah K. Staplin, Chelmsford; Jian-Kuo Shen, Belmont, both of Mass.

[73] Assignee: Bull HN Information Systems Inc., Billerica, Mass.

[21] Appl. No.: 374,881

[22] Filed: Jun. 30, 1989

[51] Int. Cl.⁵ .............................. G06F 9/30; G06F 9/38
[52] U.S. Cl. .................................. 395/375; 364/238.7; 364/261.5; 364/263; 364/231.8; 364/926.3; 364/938.1; 364/142.8; 364/948.3; 364/948.34; 364/977.5; 364/DIG. 2; 395/800
[58] Field of Search ................ 395/375, 800; 364/200 MS File, 900 MS File

[56] References Cited

U.S. PATENT DOCUMENTS

| | | | |
|---|---|---|---|
| 4,179,736 | 12/1979 | Wilhite | 364/200 |
| 4,200,927 | 4/1980 | Hughes et al. | 364/200 |
| 4,519,033 | 5/1985 | Vaughn et al. | 364/200 |
| 4,714,994 | 12/1987 | Oklobdzija et al. | 364/200 |
| 4,760,519 | 7/1988 | Papworth et al. | 364/200 |
| 4,855,947 | 8/1989 | Zmyslowski et al. | 364/200 |
| 4,890,218 | 12/1989 | Bram | 364/200 |
| 4,894,772 | 1/1990 | Langendorf | 364/200 |
| 4,912,634 | 3/1990 | Nakano et al. | 364/200 |
| 4,967,338 | 10/1990 | Kiyohara et al. | 364/200 |

Primary Examiner—David Y. Eng
Assistant Examiner—Ken S. Kim
Attorney, Agent, or Firm—Faith F. Driscoll; John S. Solakian

[57] ABSTRACT

A pipelined processing unit which includes an instruction unit stage containing logic management apparatus for processing a set of complex instructions. The logic management apparatus includes state control circuits which produce a series or sequence of control states used in tracking the different types of instructions of the complex instruction set being processed. Different ones of the states are used for different types of instructions so as to enable the different pipeline stages to operate both independently and jointly to complete the execution of different instructions of the complex instruction set.

24 Claims, 6 Drawing Sheets

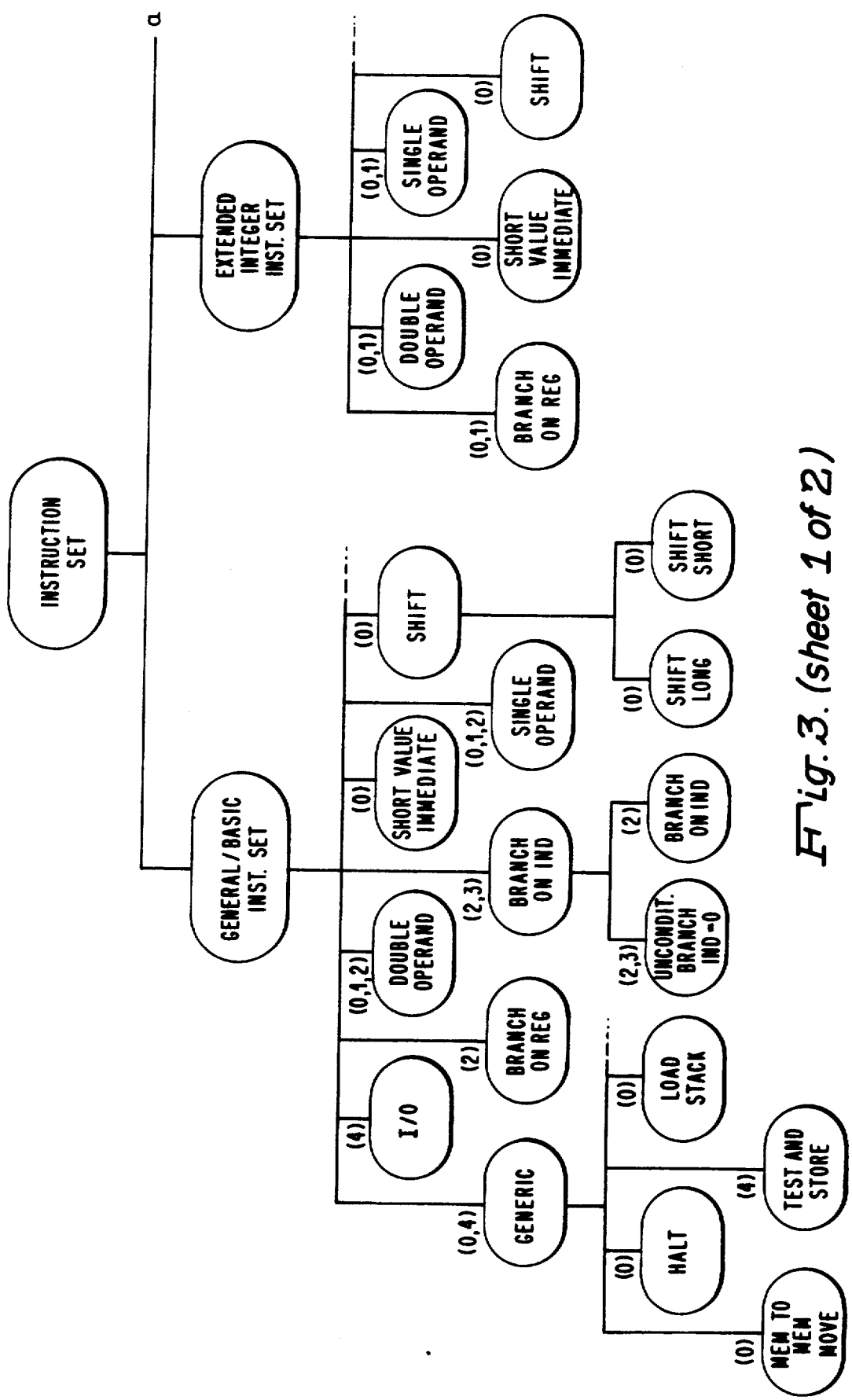
Fig. 3. (sheet 1 of 2)

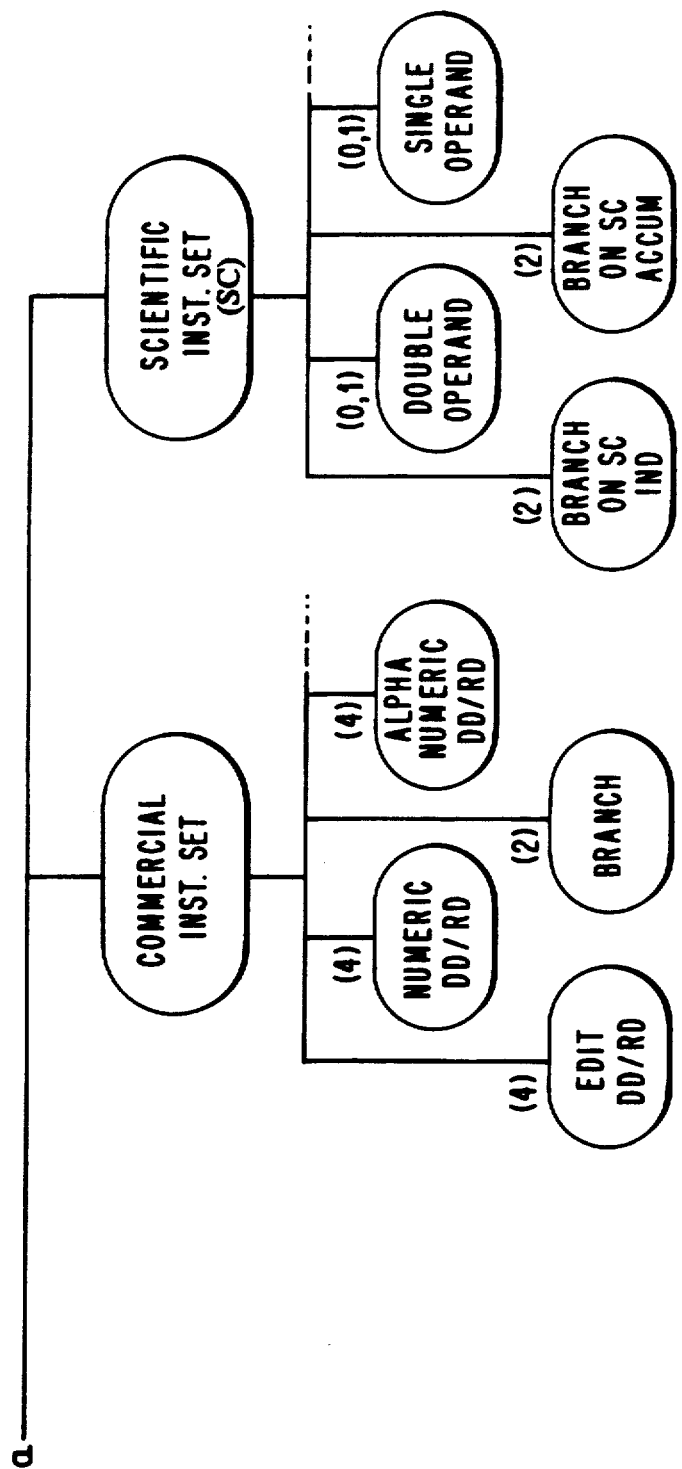
Fig. 3. (sheet 2 of 2)

```
002C          OP CODE FOR DAD
0408 001A     DD1: P+D+0 (MNEMONIC)
0030          RDD
              0211              DD2: P+BD+0
              0040 0A20         (MNEMONIC)
```
TO REMOTE MEM LOCATION
*Fig. 5a.*
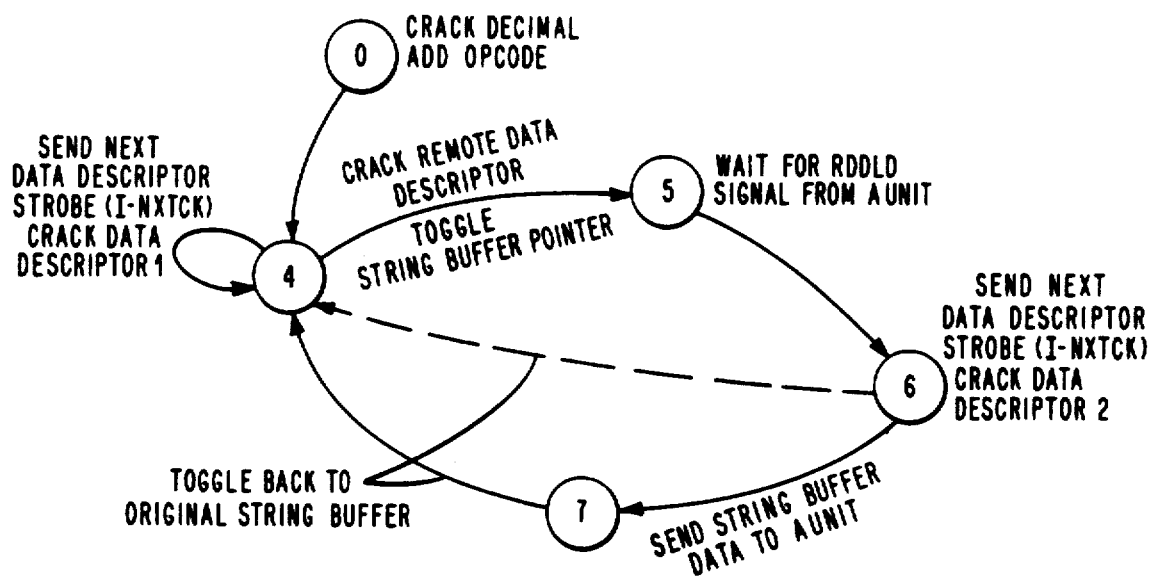
*Fig. 5b.*
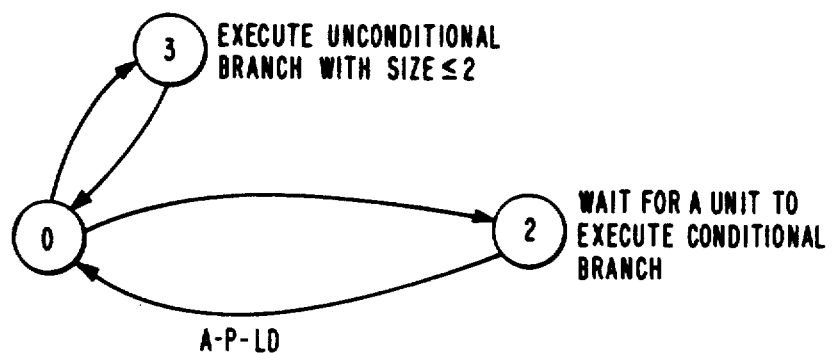
*Fig. 5c.*

STATE CONTROLLED INSTRUCTION LOGIC MANAGEMENT APPARATUS INCLUDED IN A PIPELINED PROCESSING UNIT

RELATED APPLICATIONS

1. The patent application of Ming-Tzer Miu and Thomas F. Joyce entitled, "Production Line Method and Apparatus for High Performance Instruction Execution," filed on Dec. 19, 1988, bearing Ser. No. 07/286,580, abandoned on Sep. 7, 1990 and which is assigned to the same assignee as this patent application.

2. The patent application of David E. Cushing, Romeo Kharileh, Jian-Kuo Shen and Ming-Tzer Miu entitled, "A Dual Port Read/Write Register File Memory," issued as U.S. Pat. No. 4,933,909 on Jun. 12, 1990, which is assigned to the same assignee as this patent application.

3. The patent application of Jian-Kuo Shen, Richard P. Kelly, Robert V. Ledoux and Deborah K. Staplin entitled "Control Store Addressing from Multiple Sources," filed on 07/286,578, which is assigned to Ser. No. 07/286,578, which is assigned to the same assignee as this patent application.

4. The patent application of Richard P. Kelly, Jian-Kuo Shen, Robert V. Ledoux and Chester M. Nibby, Jr. entitled, Means for Transferring Firmware Signals Between a Control Store and a Microprocessor Means Through a Reduced Number of Connections By Transfer According to Firmware Signal Function issued as U.S. Pat. No. 4,916,601 on Apr. 10, 1990, which is assigned to the same assignee as this patent application.

5. The patent application of Richard P. Kelly and Robert V. Ledoux entitled, "Control Store Address Generator for Developing Unique Instruction Execution Starting Address, " filed on Dec. 19, 1988, bearing Ser. No. 07/286,582, abandoned on Sep. 30, 1991 and which is assigned to the same assignee as this application.

6. The patent application of David E. Cushing, Richard P. Kelly, Robert V. Ledoux and Jian-Kuo Shen entitled, "Mechanism for Automatically Updating Multiple Unit Register File Memories in Successive Cycles for a Pipelined Processing System," issued on U.S. Pat. No. 4,980,819 on Dec. 25, 1990, which is assigned to the same assignee as this application.

7. The patent application of Richard P. Kelly and Robert V. Ledoux entitled,, "Automatic Data Steering Mechanism for Alignment of Operands into and out of an Execution Unit," filed on Mar. 31, 1989, bearing Ser. No. 07/331,911, which is assigned to the same assignee as this application.

8. The patent application of Robert V. Ledoux, Richard P. Kelly and Forrest M. Philips entitled, "Ring Reduction Logic Using Parallel Determination of Ring Numbers in a Plurality of Functional Units and Forced Ring Numbers by Instruction Decoding," filed on Mar. 31, 1989, bearing Ser. No. 07/332,258, which is assigned to the same assignee as this application.

9. The patent application of Deborah K. Staplin, Jian-Kuo Shen and Ming-Tzer Miu entitled, "Resource Conflict Detection Method and Apparatus Included in a Pipelined Processing Unit," issued as U.S. Pat. No. 4,073,855 on Dec. 17, 1991, which is assigned to the same assignee as this application.

BACKGROUND OF THE INVENTION

1. Field of Use

This invention relates to pipelined data processing systems and more particularly to apparatus for decoding instructions within such systems.

2. Prior Art

Many techniques have been developed in order to improve the performance of high performance systems. These have involved the development of so-called pipelined processors which process instructions stored in cache memories in such a manner that more than one instruction is actually being processed at any one given time. In such a system, one instruction might be completed within a given machine cycle at the same time as another instruction had only been partially completed.

While such systems achieve high performance, instructions are placed serially into the pipeline and as soon as the stage has completed its operation, the instruction is passed onto the next processing stage. Therefore, instructions are executed in the order in which they enter the pipeline. In order to improve system performance, some systems overlap the operations being executed by certain stages within the pipeline. An example of this type of system is described in U.S. Pat. No. 4,760,519.

While the above improves performance, instructions are still required to be executed in the order in which they are introduced into the pipeline. The performance of a pipelined system has been improved by having the processing unit operate in a production line fashion in which earlier stages are able to complete the execution of certain types of instructions ahead of earlier introduced instructions. This processing unit is subject of related copending application titled "Production Line Method and Apparatus for High Performance Instruction Execution."

While pipelined processing units provide high performance, their performance still depends greatly on the efficient processing of a large number of different types of instructions. This is complicated when there is a requirement for compatibility and where more than one stage within the pipeline is designed to execute instructions to enhance performance such as in the referenced patent application.

One approach used in handling a complex instruction set which is described in U.S. Pat. No. 4,179,736 is to use a microprogrammed data processing unit having first and second control stores and hardwired sequence circuits. The first control store includes locations which store address and control sequence fields while the second control store includes sequences of microinstructions for executing different portions of the operations specified by the program instructions. The control sequence field is used to designate which one of a number of hardware control sequences is to be carried out by the hardwired control circuits in processing the instruction through the use of control state circuits.

While this arrangement is capable of processing a complex instruction set, the two-level control store arrangement requires additional processing time and space which do not lend themselves to VLSI construction. Further, the arrangement is designed for use in a CPU containing a small number of pipeline stages having a single execution unit.

Accordingly, it is a primary object of the present invention to provide apparatus for managing the processing of a complex instruction set within a pipelined processing unit.

It is another object of the present invention to provide a method and apparatus which maximizes performance and requires a minimum of complexity.

SUMMARY OF THE INVENTION

The above and other objects of the present invention are achieved in a preferred embodiment of a pipelined processing unit which includes an instruction unit stage containing logic management apparatus for processing a set of complex instructions. According to the teachings of the present invention, the logic management apparatus includes state control circuits which produce a series or sequence of control states used in tracking the different types of instructions of the complex instruction set being processed. Different ones of the states are used for different types of instructions so as to enable the different pipeline stages to operate both independently and jointly to complete the execution of different instructions of the complex instruction set.

In more particular terms, certain states are used to enable an early pipeline stage to complete the execution of (branch and register) certain types of instructions such as, for example, branch and register instructions. Other states are used to enable the first and early pipeline stages to complete the cracking of other types of instructions such as, for example, instructions which include remote descriptors.

The novel features which are believed to be characteristic of the invention, both as to its organization and method of operation, together with further objects and advantages, will be better understood from the following description when considered in connection with the accompanying drawings. It is to be expressly understood, however, that each of the drawings are given for the purpose of illustration and description only and are not intended as a definition of the limits of the present invention.

DESCRIPTION OF THE DRAWINGS

FIG. 3 shows the instruction set of the preferred embodiment of the present invention.

FIGS. 5a and 5b illustrate the operation of a commercial numeric instruction according to the present invention.

FIG. 5c is the state transition diagram for a branch instruction according to the present invention.

DESCRIPTION OF THE PREFERRED EMBODIMENT

Figure 1:
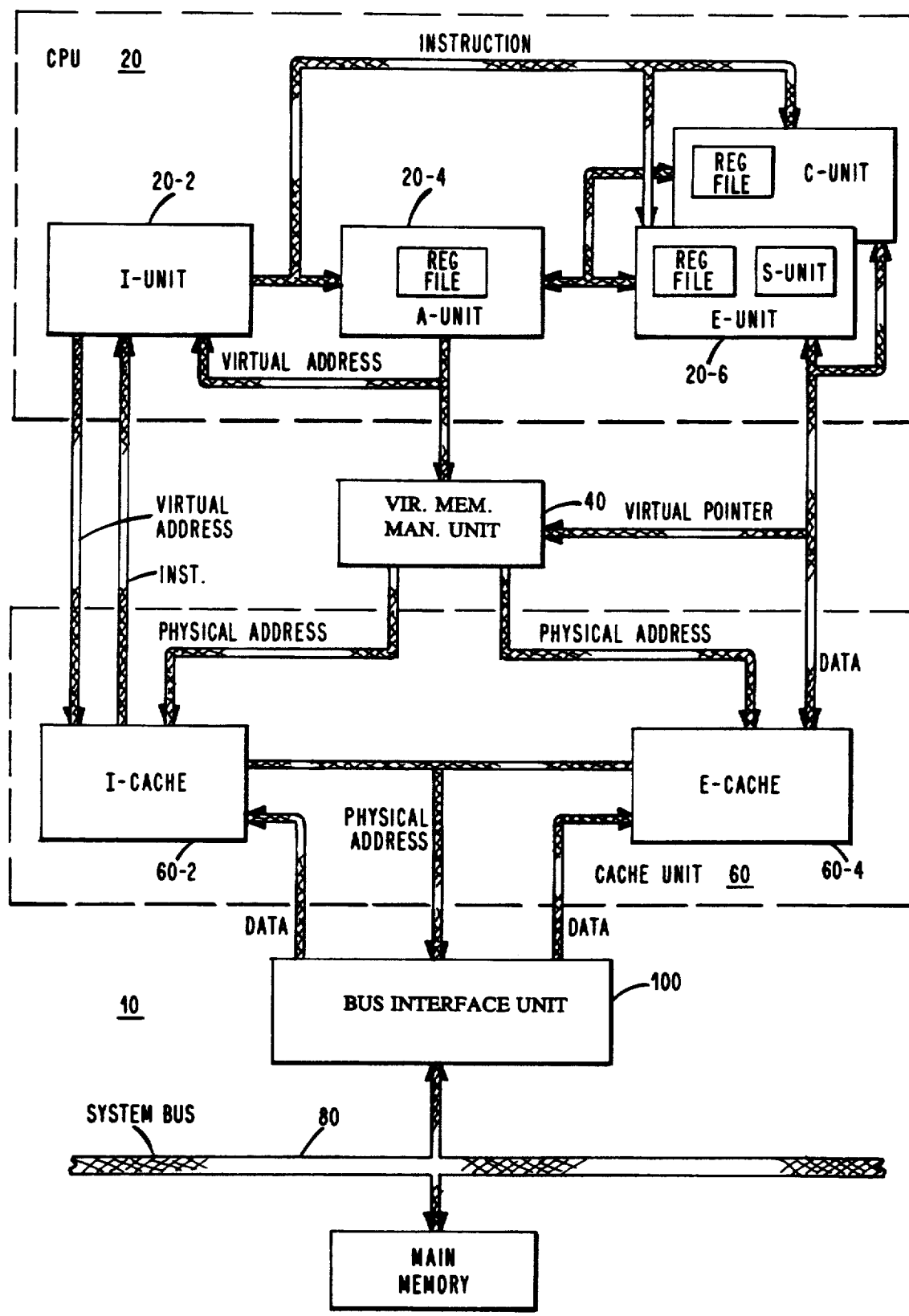
FIG. 1 is a block diagram of the pipelined processing unit which includes the apparatus and method of the present invention.

FIG. 1 shows in block diagram form, a production data processing system 10. As shown, the system includes a central processing unit (CPU) 20, a virtual memory management unit (VMMU) 40 and a cache unit 60. The cache unit 60 couples to a system bus 80 through a bus interface unit (BIU) 100. The processing unit (CPU) is constructed according to the principles of the present invention.

As shown, the main elements of CPU 10 include an instruction unit 20-2, an A-unit 20-4 and a number of execution (E) units 20-6. In the preferred embodiment, the execution units 20-6 include a scientific instruction processing unit (S-Unit) and a commercial instruction processing unit (C-Unit). The cache unit 60 includes an instruction cache (I-cache) 60-2 for storing instructions which are to be executed and an execution cache unit (E-cache) 60-4 for storing operands or data which are to be operated on according to the instructions being executed.

The I-unit 20-2 performs two main functions. It prefetches instructions from I-cache unit 60-2 and cracks or decodes those instructions to determine how the other units, namely the A-unit 20-4 and the E-unit 20-6 will further process those instructions. In addition, the I-unit 20-2 executes certain branch instructions which are then removed from the production line.

The A-unit 20-4 generates addresses from instructions it receives from the I-unit 20-2. Additionally, it executes certain types of instructions such as register-to-register type instructions removing them from the production line. When the instruction is a type of instruction which is to be executed by the E-unit 20-6, the A-unit 20-4 sends a virtual address to VMMU 40 which translates it into a physical address for fetching the specified operands from the E-cache unit 60-4. The operands fetched from the E-cache unit 60-4 are then transferred to the E-unit 20-6 for completing the execution of the instruction originally received by the I-unit 20-2 from the I-cache unit 60-2. The A-unit 20-4 will also confirm the execution of a branch instruction and send the branch address back to the I-unit 20-2 which will have already requested the next instruction from I-cache unit 60-2 specified by the I-unit 20-2 prefetch branch address.

Both the A-unit 20-4 and E-unit 20-6 include register files which store the contents of the registers which are programmer accessible, as explained in greater detail herein. Both the I-cache unit 60-2 and E-cache unit 60-4 are updated with instructions and operands fetched from main memory via system bus 100 and BIU 80.

Production Line Mode of Operation

Instructions are executed in a production like fashion by the elements of CPU 20. That is, the I-unit 20-2 receives each instruction from I-cache unit 60-2, cracks it and then sends the instruction to the A-unit 20-4. The A-unit 20-4 either executes the instruction or sends the virtual address to the VMMU 40 for translation in order to fetch the required operands from E-cache unit 60-4 which are in turn sent to E-unit 20-6.

While the A-unit 20-4 is executing its portion of a first instruction received from I-unit 20-2, the I-unit 20-2 is fetching a second instruction and subsequent instructions from I-cache unit 60-2. When the A-unit 20-4 sends the virtual address specified by the first instruction to VMMU 40 and notifies the I-unit 20-2 of that event, the I-unit 20-2 sends the second instruction to A-unit 20-4. The VMMU 40 addresses E-cache unit 60-4 while the A-unit 20-4 is processing the second instruction introduced into the production pipeline. When the E-unit 20-6 is executing the first instruction, VMMU 40 may be fetching operands from the E-cache unit 60-4 specified by the second instruction while the A-unit 20-4 is generating a virtual address for a third instruction. At the same time, the I-unit 20-2 is cracking a fourth instruction and fetching a next instruction.

Thus, there could be five instructions progressing down the production line at a given instant of time.

However, since the I-unit 20-2 can execute certain branch instructions and the A-unit 20-4 can execute certain software visible register instructions, these instructions are removed from the production line as soon as the execution of these instructions are completed. Also, when the A-unit 20-4 is processing a branch instruction and the conditions of the branch are met, the A-unit 20-4 immediately confirms the branch address received from the I-unit 20-2 and the branch instruction is removed from the production line.

Accordingly, it is important that the production line operation proceed without interruption. However, there are situations in which there may be conflicts in the resources specified by the instructions being introduced into the production line. The arrangement of the present invention utilizes the fact that certain units of the production line execute a subset of the total number of instructions. Therefore, it takes advantage in terms of performance that only certain registers and indicator resources will never be in conflict between the A-unit 20-4 and E-unit 20-6.

The reduction in resources is reflected in the resource control word(s) generated by the I-unit 20-2 as a result of cracking each instruction as explained herein. Additionally, complex instructions are specially handled. A complex instruction is an instruction which can have many potential trap conditions which make it very difficult to predict with sufficient certainty, the operating state of the pipeline before the trap took place. Such complex instructions are detected by the I-unit and cause it to stop the pipeline. This has the advantage of reducing substantially, chip circuit complexity which is important for the reasons previously mentioned.

I-UNIT 20-2

Figure 2:
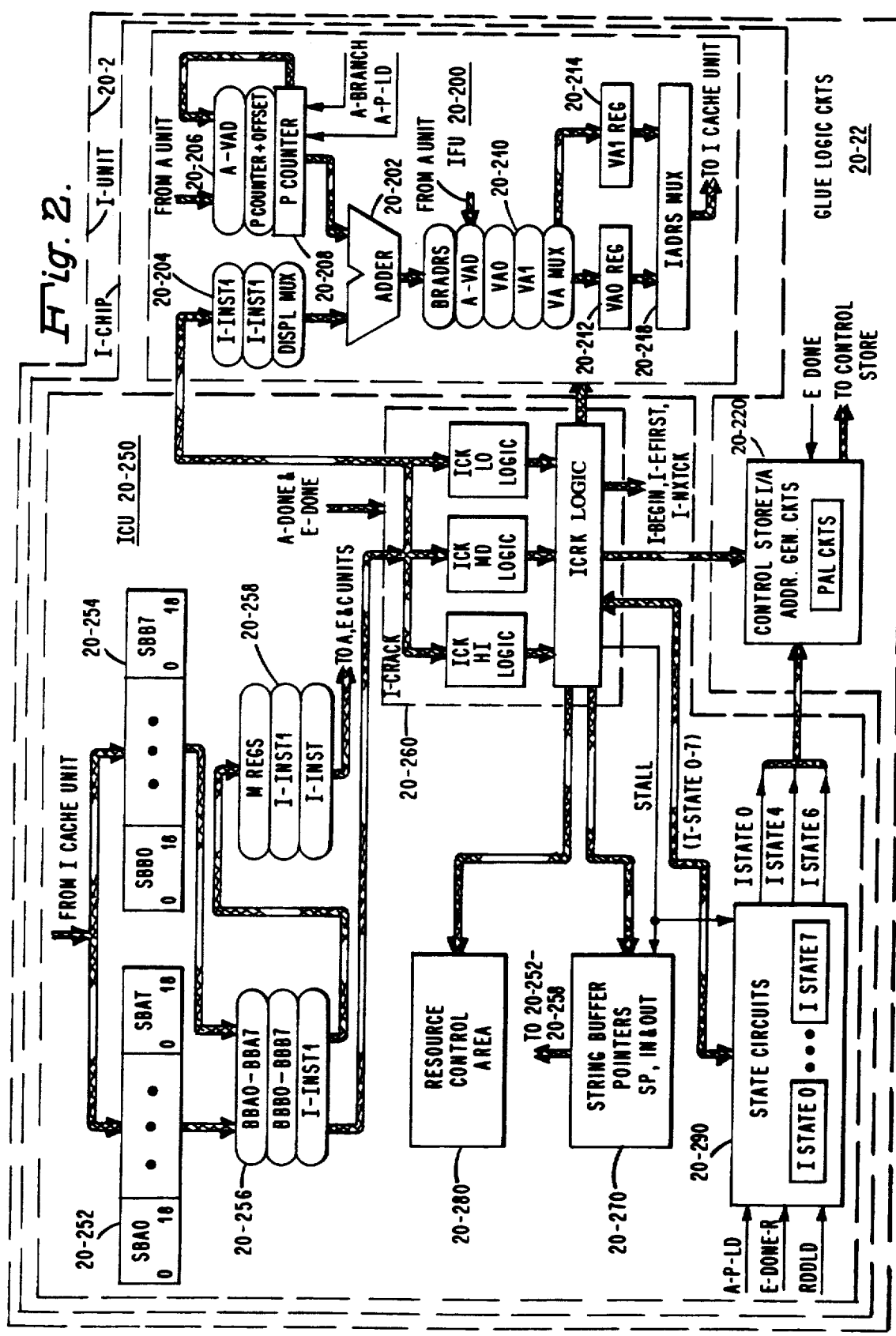
FIG. 2 shows in greater detail, the instruction unit of FIG. 1.

FIG. 2 shows the I-unit 20-2 in greater detail. The I-unit 20-2 includes an I chip 20-20 and glue logic circuits 20-22 which interconnect the I chip to the other chips of the CPU. The I chip 20-20 is logically divided into an I fetch unit (IFU) 20-200 for fetching instructions from the I-cache unit 60-2 and an I crack unit (ICU) 20-250 for "cracking" or decoding the fetched instructions.

The IFU 20-200 includes the adder, multiplexer and register elements 20-202 through 20-218 arranged as shown. The IFU 20-200 uses a local program counter 20-208 to generate branch addresses. Initially, the P counter 20-208 is loaded with a virtual address received from A-unit 20-4 via multiplexer circuit 20-206 in response to a load signal A-P-LD also received from the A-unit 20-4. The virtual address points to the location in I-cache unit 60-2 which stores the next instruction that is to enter the pipeline. During an I fetch cycle, the virtual address is transferred to I-cache unit 60-2 via multiplexer circuit 20-210 from either VA0 register 20-212 or VA1 register 20-214 through multiplexer circuit 20-218.

Either VA0 register 20-212 or VA1 register 20-214 is used to furnish the virtual address until a branch instruction is decoded by the I-unit 20-2. At that time, it will switch the VA register such that if VA0 register is active, then the address called for by the branch instruction is then stored in VA1 register 2-214. If the ICU 20-250 detects a small (seven or sixteen bit) displacement branch instruction, then the I-unit will generate the branch address by sending a 16-bit displacement value to IFU 20-200 via multiplexer circuit 20-204. This value is added via adder 20-202 to the contents of the P counter create the branch address. It is then loaded into the VA register selected by the VA pointer.

The ICU 20-205 includes two sets of string buffers (SBA and SBB) which correspond to blocks 20-252 and 20-254. Each buffer includes eight 16-bit registers and receives data from the I-cache unit, thirty-two bits at a time. As shown, each instruction read out of I-cache unit 60-2 is loaded into either buffer 20-252 or 20-254. The ICU 20-250 maintains a current string pointer denoting which of the two string buffers is in use, in addition to input and output pointers for each buffer.

One of the string buffers receives a stream of successive instructions from I-cache unit 60-2 until there is a branch instruction. The instructions of the stream following the branch instruction are stored in the other string buffer. As shown, each instruction of the instruction stream being processed is transferred via multiplexer 20-256 to the I crack logic circuits of block 20-260 and to the A- and E-units via multiplexer 20-258. The I crack logic circuits of block 20-260 include three cracking or decoding circuit areas ICKHI, ICKMD and ICKLO. Each of the crack areas decode or crack in parallel, a different group of bits of each instruction.

The results of the first stage are applied to a second stage of cracking or decoding which corresponds to the block labeled ICRK. The ICRK stage determines exactly what instruction is being processed with which address syllable, etc. That is, it determines the specific kind of instruction which is to be executed. For example, if it is a software visible register to register instruction, it will be executed by the A-unit 20-2, and if it is a memory instruction, it will be executed by the E-unit 20-6. The ICRK stage provides signals to update the string buffer counters 20-270 and the resource control pointer circuits of the resource control area block 20-280. The I crack circuits 20-260 also apply the instruction word signals to the control store I/A address generation circuits 20-220 of the glue logic circuits 20-22. The generation circuits 20-220 address the A-unit control store which reads out a microinstruction word into the A-unit RDR register for executing the instruction.

The last part of ICU 20-250 is the state control circuits of block 20-290 which is constructed according to the teachings of the present invention. These circuits control the sequencing of the I-unit 20-2 in cracking the different types of instructions of the complex instruction set of FIG. 3. It also generates output signals, such as signals state 0, 4 and 6, which are applied to the control store address generation circuits 20-220 which generates the addresses of firmware/microinstruction words used by A-unit 20-4 in executing instructions. Additionally, the state control circuits 20-290 control the states of string buffer pointers and their associated string buffers as explained herein.

The circuits 20-290 include a plurality of state flip-flops ISTATE0 through ISTATE7. These flip-flops include circuits which set and reset the flip-flops as a function of the type of instruction and size as described herein. The equations for setting and resetting each of these state flip-flops are included in the Appendix.

INSTRUCTION SET OF FIG. 3

As mentioned, the state control apparatus of the present invention enables I-unit 20-2 to control efficiently, the processing of the complex instruction set of FIG. 3 by a plurality of pipeline stages capable of completing the execution of different types of instructions within such set. As seen from FIG. 3, the instruction set is divided into several categories of instructions. These include: a general or basic instruction set; an extended integer (EII) instruction set; a commercial instruction set, and a scientific instruction set. The basic instruction set includes seven types of instructions, such as generic, branch on indicators, branch on registers, shift short and shift long, short value immediate, input/output, single operand and double operand.

The generic instructions executable by the E-unit 20-6 include a halt instruction, a diagnostic instruction, a memory-to-memory move instruction and a load stack instruction. They also include other instructions which allow programmers to build and control a software stack. These instructions are executable by I-unit 20-2, A-unit 20-4 and E-unit 20-6.

The EII instruction set is executed by the E-unit 20-6 and provides access to any one of seven K registers. As shown, this instruction set includes instructions for loading an operand into a specified K register, comparing the value in a specified K register with an operand, etc.

The commercial instruction set is executed by the C-unit of block 20-6. These instructions include numeric, alphanumeric and edit. As shown, certain ones of these instructions can use in-line data descriptors which describe the one-to-three operands used by the instruction with the number of operands being a function of instruction type. The same instructions can also specify remote data descriptors to describe the same one-to-three operands used by the instruction. The bits 12-15 of the first word of a data descriptor is coded to distinguish between in-line and remote data descriptors. For a further description of the formatting of these types of instructions, reference may be made to U.S. Pat. No. 4,638,450.

The scientific instruction set is executed by the scientific unit apparatus included in E-unit 20-6. These instructions include single operand and double operand instructions.

Figure 4:
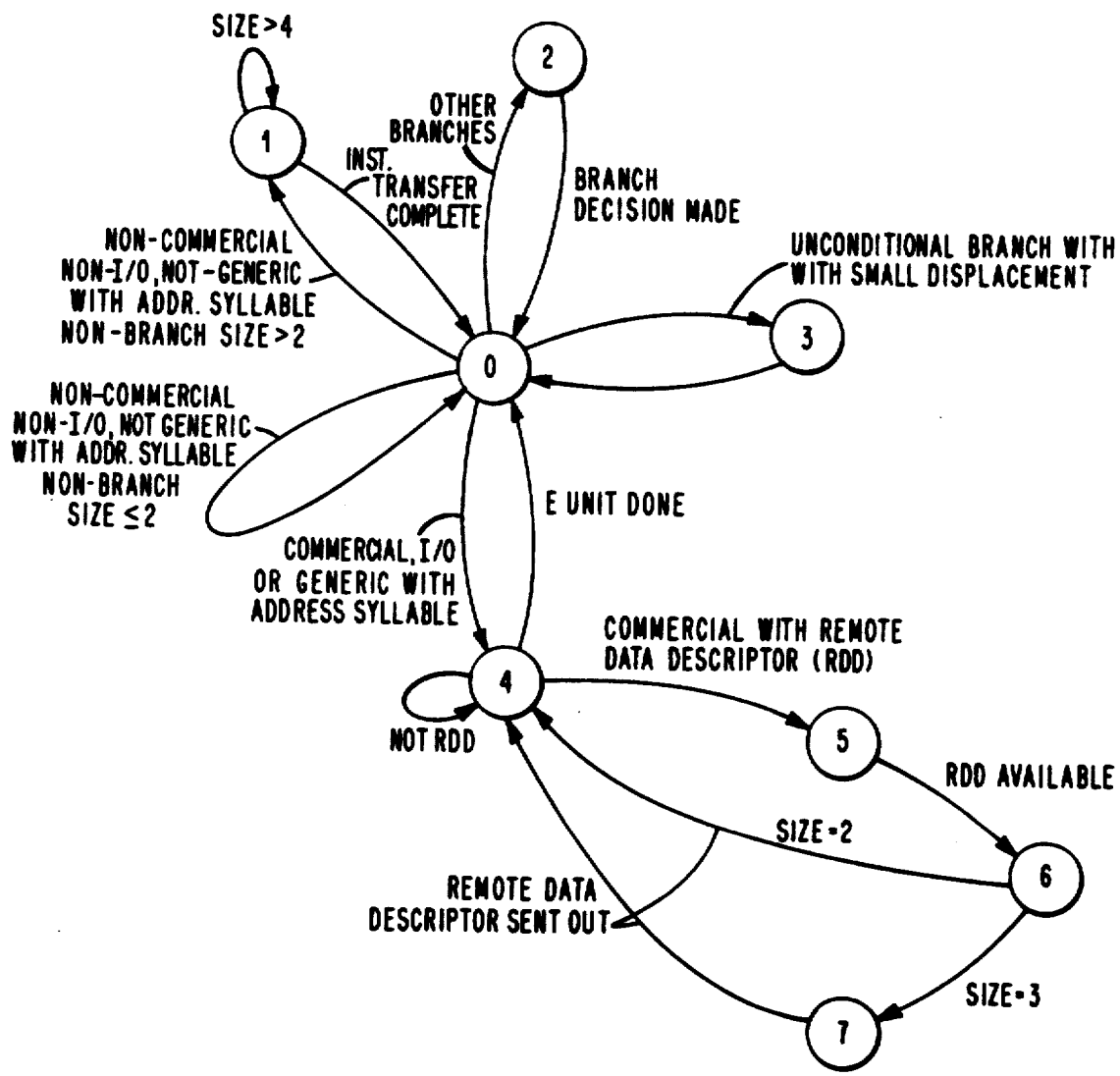
FIG. 4 is state transition diagram used to explain the operation of the preferred embodiment of the present invention.

These different instruction sets are cracked by the I crack logic circuits 20-260 and the resulting information signals are applied to the control state circuits 20-290. FIG. 4 shows the assignment of states to the different types of instructions of the four instruction sets. The I-unit 20-2 starts instruction cracking in state 0 which serves as an idle state. Based on the instruction type and size, it sequences to the other states as shown. For example, if the instruction being cracked is not a commercial, not I/O, not generic with address syllable and not a branch, and its size is less than or equal to two words, the control state circuits 20-290 remain in state 0. If the instruction being cracked is not commercial, I/O, generic or a branch, and its size is larger than two words, the control state circuits 20-290 sequence to state. 1. If the instruction is a branch other than an unconditional branch, or an unconditional branch with other than small displacement or with trace trap enabled, the control state circuits 20-290 sequence to state 2. For unconditional branch instructions with small displacements and trace trap disabled, the control state circuits 20-290 sequence to state 3.

For commercial, I/O or those types of new generic instructions which have an address syllable, the control state circuits 20-290 sequence to state 4 as shown. The circuits 20-290 remain in state 4, except when the instruction being cracked is a commercial instruction with a remote data descriptor.

When the E-unit 20-6 completes the execution of the instruction and sends an E-unit done signal, the control state circuits 20-290 return to state 0. If the instruction being cracked is a commercial instruction with a remote data descriptor, the control state circuits 20-290 sequence through states 5 and 6 or states 5, 6 and 7 as a function of the size or number of words in the data descriptor.

DESCRIPTION OF OPERATION

In accordance with the teachings of the present invention, the states used by the circuits 20-290 are selected to enable the execution of certain types of instructions to be completed solely by one specific pipeline stage or jointly by more than one stage in a manner which improves performance and minimizes complexity. With reference to FIGS. 1-4, the operation of the apparatus will now be described relative to the examples illustrated in FIGS. 5a through 5c.

The FIGS. 5a and 5b illustrate the manner in which I-unit 20-2 and A-unit 20-4 work together in processing commercial instructions containing remote data descriptors. A remote data descriptor is a descriptor that is inaccessible to I-unit 20-2 in that the I-unit 20-2 does not have enough information to access it. However, the A-unit 20-4 includes the necessary circuits for generating the required descriptor address. This address is transferred to the I-unit, which can then fetch the remote descriptor.

It is assumed that the instruction being cracked is a commercial numeric type instruction such as a decimal add (DAD) instruction which has two data descriptors. The first descriptor is in-line and includes a displacement to be added to the P counter. The second descriptor is a remote data descriptor and includes a "big displacement" (BD) of two words to be added to the P counter.

The DAD instruction is cracked by I-unit 20-2 when in state 0 as shown in FIG. 5b. Thereafter, the control state circuits 20-290 sequence to state 4. When in that state, the control state circuits 20-290 crack the first data descriptor which is determined to be an in-line descriptor (i.e., bits 12-15 are not all ZEROS). The I-unit 20-2 remains in state 4 and transfers the descriptor to the A-unit.

At such time as the A-unit is ready for the second data descriptor, it sends a CPCK firmware code to the I-unit 20-2. Then the I-unit moves to the second data descriptor word and cracks it. In this case, it determines that this word is not a data descriptor but a pointer to a remote memory location. The I-unit transfers the pointer to the A-unit along with the strobe I-NXTCK. As seen from FIG. 5b, the state circuits 20-290 move from state 4 to state 5 and allow the A-unit 20-4 to generate the address of the remote data descriptor. Thus, state 5 is a wait state for the I-unit 20-2.

As seen from FIG. 5b, when the I-unit 20-2 moves to state 5, it toggles the string buffer pointer SP so that it points to the alternate set of string buffer registers. It also toggles to the alternate virtual address register. This provides storage for the remote data descriptor address to be generated by the A-unit 20-4 and the descriptor itself. That is, when the remote data descriptor words have been stored in instruction cache unit 60-2, A-unit 20-4 forces a remote data descriptor signal RDDLD to a binary ONE, enabling the descriptor address to be loaded into the alternate virtual address register. This causes the state circuits 20-290 to move from state 5 to state 6. In state 6, the virtual address is sent to the I cache 60-2. The descriptor is then fetched from I cache and transferred to the alternate string buffer.

The I-unit 20-2 transfers the first two words from the alternate string buffer and cracks the words. These words are transferred to the A-unit via an instruction bus along with the strobe I-NXTCK. In the present example, it is assumed that the remote data descriptor is three words. Therefore, the control state circuits 20-290 move to state 7 before returning to state 4 to transfer the second and third descriptor words to A-unit 20-4. Note that the second data descriptor word is transferred twice. It is transferred once with the first word, which the A-unit expects to be left justified on the instruction bus, and again with the third word, which the A-unit expects to be right justified on the bus. In the case where the remote data descriptor is two words long, the control state circuits 20-290 move from state 6 to state 4. Upon returning to state 4, the control state circuits 20-290 toggle the string pointer back to the original string buffer to continue the processing of the current instruction stream.

From the above, it is seen how the I-unit 20-2 and A-unit 20-4 operate together under the control of state circuits 20-290 in processing commercial type instructions containing remote data descriptors. Through this joint effort, the I-unit 20-2 is able to crack this type of complex instruction, eliminating the need to include additional circuits within the C-unit of block 20-6 to carry out such operations.

FIG. 5c illustrates the manner in which the I-unit 20-2 processes branch types of instructions under the control of state circuits 20-290. As discussed, two different states are used for branch instructions. In the case of an unconditional branch instruction with a small displacement and trace trap disabled, the I-unit 20-2 is able to generate the branch address through IFU 20-200. Since the result of the branch is known (i.e., it is unconditional), the I-unit 20-2 can both prefetch the next instruction stream and begin cracking instructions within the stream while the A-unit 20-2 executes in parallel the same branch instruction. Following the A-unit's completion of the unconditional branch instruction, it generates the A-BRANCH signal, enabling the branch address to be loaded into the P counter.

By allocating a separate state (i.e., state 3) for unconditional branch instructions, it is possible to eliminate an extra cycle of operation. That is, it eliminates the need to wait for the A-unit to complete execution of the branch before cracking the next instruction. Thus, the control state circuits 20-290 move to state 1 and return immediately to state 0.

In the case of conditional branch instructions, the control state circuits 20-290 move from state 0 to state 2. The circuits 20-290 remain in state 2 until signal A-P-LD is received from A-unit 20-4 indicating that it has generated the branch address and completed the branch.

From the above, it is seen that through the efficient use of control state circuits, in cracking branch type instructions, increased performance is attained. Since unconditional branch instructions are frequently used, the savings in cycles could prove to be substantial.

APPENDIX

The mnemonics of the instructions are given in the publication entitled, "Hardware Version of DPS6 Programmers Pocket Guide," Order No. CU75-02 (August 1984) and subsequent updates. The notations in the Boolean equations are as follows:

| | |
|---|---|
| EQ 0100 | EQUAL TO HEXADECIMAL 0100 |
| GT 3 | GREATER THAN HEXADECIMAL 3 |
| EQ 2 | NOT EQUAL TO HEXADECIMAL 2 |
| NLT 018 | NOT LESS THAN HEXADECIMAL 018 |
| NGT 01E | NOT GREATER THAN HEXADECIMAL 01E |
| LT 3 | LESS THAN HEXADECIMAL 3 |

The I-BEGIN signal is generated by the Boolean equation:

$$I\text{-}BEGIN = CRACK\ \&\ ^*STALL\ \&\ ^*HOLD$$

$$\text{wherein } CRACK = STATE0\ \&\ ^*NONELEFT\ \&\ ADONE\ \&(^*ONELEFT + STATE0SIZ1).$$

The ^ signifies a negated signal, i.e., ^HOLD should be read as the "NOT HOLD" signal.

The Boolean equation for the I-EFIRST signal is:

$$I\text{-}EFIRST = CRACK\ \&\ ^*STALL\ \&\ EINSTR.$$

The Boolean equation for signal EINSTR is generated as a function of combinations of bits of the different types of instructions that require execution by the E-unit 20-6. The Boolean equation is:

```
EINSTR = GCS + (IO + IOLD + SC + MASK + BIT4 +
LB + LEV + INCDEC & *RAS + MTM + MUL + DIV +
STM + SSBP) & *EII + (BSTORE + EBIM0) & IMO +
EMSK & EII + MLV & (SI + ESI & EII1) + (ESO + EDO) &
( *ERAS&(EII1 + EII23) + AS3EII45) + EEII &
(EII1 + EII23) + (SDO + SO) & *RAS & *IMO &
*EII.
```

| DESCRIPTION OF EQUATION TERMS |
|---|
| GENERIC, COMMERCIAL, OR SCIENTIFIC INSTRUCTIONS |
| GCS = I-INST (0-8).EQ.0; |
| IO INSTRUCTION |
| IO = (I-INST (0-8).EQ.0100) |
| IOLD INSTRUCTION |
| IOLD = I-INST (0-8).EQ.0103 |
| SINGLE OPERAND INSTRUCTIONS |
| SO = (I-INST (0-3).EQ.8 & ((I-INST (4-8).EQ.1) + (I-INST (4-8).GT.3)) |
| SINGLE OPERAND INSTRUCTION THAT USES B REGISTERS IN THE E-UNIT 2-6 |
| SSBP = I-INST (0-8).EQ.0106 |
| SINGLE OPERAND INSTRUCTIONS THAT USE OVERFLOW: (NEG, CAD, AID, SID, INC., DEC. INSTRUCTIONS) |
| SOV = SO & ((I-INST (4-8).EQ.4) + (I-INST (4-8). EQ.01D) + (I-INST (4-7).EQ.4)) + INCDEC |
| LB INSTRUCTION |
| LB = SO & (I-INST (4-8).EQ.05) |
| BIT INSTRUCTIONS (LBF, LBT, LBC, LBS) |
| BIT4 = (I-INST (0-5).EQ.022) & (I-INST (8).EQ.0) |
| BASIC DOUBLE OPERAND OR SCIENTIFIC INSTRUCTIONS |
| SDO = (I-INST (0-3).GT.8) & (I-INST (4-8).NEQ.2) |
| BASIC INSTRUCTIONS WITH IN-LINE MASK WORD: (SRM, NSAVE, NRSTR, SAVE, RSTR) |

| DESCRIPTION OF EQUATION TERMS |
|---|
| MASK = (I-INST (0).EQ.1) & (RLBP.NEQ) & I-INST (4-8).<br>EQ.015) + (I-INST (0-7).EQ.085) + (I-INST<br>(0-7).EQ.08F) |
| SCIENTIFIC SINGLE AND DOUBLE OPERAND INSTRUCTIONS |
| SC = ((I-INST (0-3).GT.8) & ((I-INST (4-8).EQ.011) +<br>(I-INST (4-8).EQ.013) + (I-INST (4-8).<br>EQ.018) + (I-INST (4-8).EQ.01A))) & ^EII1 &<br>^EII23 & ^AS3EII45 |
| DOUBLE OPERAND INSTRUCTION THAT USES M REG AND DOES NOT STOP PIPELINE |
| STM = (I-INST (O).EQ.1) & (RLBP.NEQ.0) & (I-INST<br>(4-8).EQ OE) |
| WHERE RLBP = I-INST (1-3) |
| MULTIPLY INSTRUCTION |
| MUL = (I-INST (0).EQ.1) & (RLBP.NEQ.0) & (I-INST<br>(4-8).EQ 016) |
| DIVIDE INSTRUCTION |
| DIV = (I-INST (0).EQ.1) & (RLBP.NEQ.0) & (I-INST1<br>(4-8).EQ 06) |
| MODIFY OR TEST M REGISTER INSTRUCTION |
| MTM = (I-INST (0-3).GT.8) & (I-INST (4-8).EQ.0) |
| SO, DO STORE INSTRUCTIONS NEG. SSBP. CPL. CALL, CL, CLH, LBF, DEC, LBT, LBS, INC, LBC, STS, SDI, CAD (ALSO LEN) STM, STH, SRM, SWR, SWB, STR, STB |
| BSTORE = SO & ((I-INST(4-8).EQ.4) + (I-INST(4-8).<br>EQ.6) + (I-INST(4-6).EQ.3) + (I-INST(4-7).<br>EQ.OA) + (I-INST(4-7).EQ.8) + (I-INST(4-8).<br>EQ.018) + (I-INST(4-8).EQ.01A) + (I-INST<br>(4-7).EQ.OE)) + BIT4 + SDO & ((I-INST(5-7).<br>EQ.7) + (I-INST(4-8).EQ.015) + (I-INST(4-6).<br>EQ.7)) |
| SHORT VALUE IMMEDIATE INSTRUCTIONS |
| SI = (I-INST(0).EQ.0) & (RLBP.NEQ.O) &<br>(I-INST(4-7).GT.OB) |
| IMO INSTRUCTIONS THAT USE B REG IN E-UNIT 2-6 (LDB, LAB, STB, SWB) |
| EBIMO = (I-INST(0-3).GT.8) & ((I-INST(4-8).EQ.019) +<br>(I-INST(4-8).EQ.017) + (I-INST(4-8).EQ.01D) +<br>(I-INST(4-8).EQ.01F)) |
| LEV INSTRUCTION |
| LEV = SO & (I-INST(4-8).EQ.01C) |
| INC AND DEC INSTRUCTIONS |
| INCDEC SO & ((I-INST(4-8).EQ.011) + (I-INST (4-8).<br>=<br>EQ 015)) |
| MLV OR MLVK INSTRUCTION |
| MLV = I-INST(6-7).EQ.3 |
| EXTENDED INTEGER SINGLE OPERAND INSTRUCTIONS |
| ESO = (I-INST(0-3).EQ.8) & (I-INST(4-8).NLT.018) &<br>(I-INST(4-8).NEQ.01B) & (I-INST(4-8).NGT.01E) |
| EII SO THAT USE OVERFLOW & DOES NOT STOP PIPELINE: KINC, KDEC, KNEG, KNEGB INSTRUCTIONS |
| ESOV = ESO & (I-INST(6-7).LT.3) & (I-INST(6-8).NEQ.1) |
| EII SHORT VALUE IMMEDIATE INSTRUCTIONS |
| ESI = EBK & (I-INST(8).EQ.1) |
| EXTENDED INTEGER DOUBLE OPERAND INSTRUCTIONS |
| EDO = (I-INST(0-3).GT.8) & (I-INST(4-7).NLT.4) |
| EXTENDED INTEGER INSTRUCTION (EII) INSTR WITH IN-LINE MASK DOUBLEWORD |
| EMSK = (I-INST(0).EQ.1) & (RLBP.NEQ.0) &<br>(I-INST(4-8).EQ.OF) |
| WHERE RLBP = I-INST (1-3) |
| EII INSTRUCTIONS EXECUTED IN E-UNIT 2-6 THE INSTRUCTION INCLUDES A REGISTER ADDRESS SYLLABLE (RAS) OR AN (IMO) (KDIV, KMUL, KMULP, KDIVP INSTRUCTIONS) |
| EEII = KDIV + KMUL + KDIVP + KMULP |
| KDIV = (I-INST(0).EQ.1) & (RLBP.NEQ.0) &<br>(I-INST(4-8).EQ.017) |
| KMUL = (I-INST(0).EQ.1) & (RLBP.NEQ.0) &<br>(I-INST(4-8).EQ.01F) |
| KDIVP = (I-INST(0) & (RLBP.NEQ.0) & (I-INST(4-8).<br>EQ.01C) |

| DESCRIPTION OF EQUATION TERMS |
|---|
| KMULP = (I-INST(0).EQ.1) & (RLBP.NEQ.0) &<br>(I-INST(4-8).EQ.01E) |
| EII1 = I-INST(9-15).EQ.06C |
| EII23 = I-INST(9-15).EQ.07C |
| AS3EII45 = I-INST(9-15).EQ.058 |
| RAS = (I-INST(9-11).EQ.5) & (I-INST(12).EQ.0) &<br>(I-INST(13-15).NEQ.0) |
| IMO = I-INST(9-15).EQ.070 |
| KAS = (I-INST(23-28).EQ.01A) & NC |
| ERAS = (I-INST(24-28).EQ.01A) & NC |
| NC = I-INST (29-31).NEQ.0 |
| EII = EII1 + EII23 + AS3EII45 |

The STALL signal is generated according to the following Boolean equations:

| |
|---|
| STALL = STALL1 + STALLX (external) + EMPTY (no instruction in buffers); |
| STALL1 = LOCK + (LESTOP + RT6A + RT6E) &<br>CRACK + EFULL & EINSTR & CRACK +<br>(STORCNT.EQ.2) & EINSTR & CRACK &<br>^EC-STCOMP + STATE4 & ADONE &<br>^CPCK & ^GNCK & ^RSCK & ^CSCK +<br>RTV02 + RTV05 + RTV06 + RTV12 +<br>RTV13 + RTV14 + RTV16 + ISTL +<br>CRACK & (SCB & RE-DONE1-E + LAOUT +<br>LEOUT) + (RINT + RUN-OUT) & CRACK. |

The ISTATE signals are generated according to the following case statement:

```
If (SCLK & Q120 & ^HOLD1 & (STATE1 &
  ^(NONELEFT + ONELEFT) & (RSIZE.EQ.2) + STATE2 &
  A-P-LD + STATE3 + STATE4 & ECNTEQ1 & E-DONE-R +
  LOADP))
THEN (NOTST0 = 0, STATE1 = 0, STATE2 = 0, STATE3 =
0, STATE4 = 0, STATE5 =0, STATE6 = 0, STATE7 = 0);
If (^LOADP & SCLK & Q120 & HOLD1 & STATE0 &
     STALL & ^CB & ADONE & ( ^EBK + ^EII23) & ( ^B +
   ( ^SIZE.NLT.3)) & ^CIP& ^IO& ^IOLD& ^(GCS&
  GENE & ^OGC))
THEN (STATE1 = 1, NOTST0 = 1);
If( ^LOADP & SCLK & Q120 & ^HOLD1 & STATE0 &
     ^STALL & ADONE & (CB + EBK & EII23 + UB & M1(0) +
   B&(SIZE.LNT.3) + JUMP & ^EII))
THEN (STATE2 = 1, NOTST0 = 1);
If ( ^LOADP & ^STALL & (SIZE.NGT.2) & STATE0 & B &
     ADONE & ^M1(0) & SCLK & Q120 & ^HOLD1)
THEN (STATE3 = 1, NOTST0 = 1);
If ( ^LOADP & SCLK & Q120 & ^HOLD1 & (ADONE &
     STATE0 & STALL & (CIP + IO + IOLD + GCS & GENE
   & ^OGC) + STATE 6 & (SIZE.EQ.2) &
   (NONELEFT + ONELEFT) + STATE7 & (RSIZE.EQ.2) &
   ^(NONELEFT + ONELEFT)))
THEN (STATE4 = 1, STATE6 = 0, STATE7 = 0, NOST0 =
1);
NOINC =
     STATE6 & (SIZE.EQ.2) & ^(NONELEFT + ONELEFT) +
     STATE7 & (RSIZE.EQ.2) & ^(NONLEFT + ONELEFT);
If ( ^LOADP&SCLK & Q120 & ^HOLD1 & ADONE &
  STATE4 & SSORDD & CPCK & ^STALL)
THEN (STATE5 = 1, STATE4 = 0);
If ( ^LOADP & SCLK & Q120 & ^HOLD1 & STATE5 &
  RDDLD)
THEN (STATE6 = 1, STATE5 = 0);
If ( ^LOADP & SCLK & Q120 & HOLD1 & STATE6 &
  (SIZE.EQ3) & ^STALL)
THEN (STATE7 = 1, STATE6 = 0);
```

The STRING POINTER is updated according to the following "If" statements:

```
If (SCLK & Q120 & ^HOLD1 & ((SIZE NGT.2) & (CB +
```

```
-continued
UB ← (EBK&E1123)) & STATE0 & ADONE - STATE4 &
SSORDD & CPCK + STATE2 & (RSIZE.EQ.2)) &
^STALL)
THEN (SP = ^SP);
If (SCLK & Q120 ^HOLD1 & LOADP)
THEN (SP = ^SP).
```

The remote descriptor load signal RDDLD is generated by A-unit 20-4 according to the following Boolean equation:

$$RDDLD = (RROS(7\text{-}10).EQ.6)\&(RROS(3\text{-}4)).EQ.2)\&\ \hat{}\ RHOLD;$$

$$If\ (SCLK\&Q120\&\ \hat{}\ HOLD)\ THEN\ (RROS\ (0\text{-}10) = I\text{-}ROS(53\text{-}63));$$

wherein RHOLD is HOLD argument from previous step (cycle) GLUE logic circuits.

The I-NXTCK strobe signal, which accompanies the second and following descriptors, is generated by the Boolean equation:

$$I\text{-}NXTCK = STATE4\ \&\ (CPCK + CSCK + RSCK + GNCK) + STATE6$$

where CPCK, CSCK, RSCK and GNCK are generated by the A-unit firmware control store bits for indicating when the next descriptor is to be cracked by the I-unit for commercial, I/O and generic instructions.

It will be obvious to those skilled in the art that many changes may be made to the preferred embodiment of the present invention without departing from its teachings. For example, different states and different instruction sets may be used. Other changes will be readily apparent to those skilled in the art.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. Instruction apparatus for controlling the execution of a plurality of different types of instructions of an instruction set in a pipelined mode by a plurality of serially coupled stages of a pipelined processing unit, each stage for performing a different operation in the execution of each instruction received by said processing unit, said instructions being received by a first one of said stage, in succession, and said apparatus being included in a first one of said stages and comprising:

(a) crack decode means for generating a plurality of signals in response to each instruction of said instruction set, said plurality of signals differing for each different type of instruction;

(b) control state means coupled to said crack decode means for generating a plurality of state signals corresponding to a number of machine states in response to different ones of said plurality of signals, said state signals generated by said control state means being determined in part by said plurality of signals and each one of said state signals generated defining a current machine state of said control state means; and, (c) means for applying said state signals to one or both of said first stage and a second one of said pipeline stages for causing said stages to execute different operations for each instructions causing the generation of a corresponding one of said state signals.

2. The apparatus of claim 1 wherein said state signals generated in response to said plurality of signals corresponds to instruction type and size and said operations executed jointly by said first and second ones of said stages and independently by said first and second ones of said stages complete execution of certain types of instructions for increased performance.

3. The apparatus of claim 2 wherein said apparatus further includes means for decoding each instruction of said instruction set when said control state means is in a first one of said machine states.

4. The apparatus of claim 3 wherein said first one of said machine states corresponds to state 0.

5. The apparatus of claim 3 wherein said control state means further includes first means which in response to said plurality of signals from said decode means designating each instruction of a first type switches said control state means from said first one of said machine states to second and third ones of said machine states respectively for causing said first and second ones of said stages to execute said different operations which complete the execution of instructions of said first type.

6. The apparatus of claim 5 wherein said first type of instructions are branched instructions and wherein said different operations executed by first one of said stages corresponds to executing a first class of branch instruction only when said control means is in said second state and said different operation executed by said second one of said stages corresponds to executing a second class of branch when in said third state.

7. The apparatus of claim 3 wherein said control state means further includes:

second means in response to said plurality of signals from said decode means designating each instruction of a second type, switching said control state means from said first one of said machine states to a fourth one of said machine states for decoding said second type of instructions; and, third means for switching said control state means from said fourth one of said machine states to a fifth one of said machine states in response to said plurality of signals of a predetermined one of said second types of instructions for enabling said first and second ones of said stages to execute said different operations in which said second one of said stages fetches additional portions of said predetermined one of said second type of instructions and said first one of said stages decodes said additional portions.

8. The apparatus of claim 7 wherein said predetermined one of said second types of instructions corresponds to an instruction which includes a remote data descriptor.

9. The apparatus of claim 7 wherein said control state means further includes:

fourth means in response to said plurality of signals representative of instruction size switching said control state means from said fifth one of said states to a number of other states in succession determined by said instruction size causing said second one of said stages to execute operations for fetching said additional portions of said predetermined one of said second type of instructions.

10. The apparatus of claim 7 wherein said first one of said stages further includes buffer storage coupled to said crack decode means, said buffer storage having first and second string buffers and a string pointer for designating which of said string buffers is currently in use and wherein said third means includes means for toggling said string pointer for enabling said additional portions of said predetermined one of said second type of instructions fetched from a remote memory location to be loaded into one of said first and second string buffers currently not in use for decoding by said crack decode means of said first one of said stages.

11. The apparatus of claim 10 wherein said fourth means further includes means for switching said control state means from said fifth one of said states to a sixth one of said states for causing said crack decode means to crack one of said additional portions of said predetermined one of said second type of instructions stored in one of said first and second string buffers which is currently not in use and generating signals for transferring said one of said additional portions of said predetermined one of said second type of instructions to said second one of said stages together with a next descriptor strobe signal.

12. The apparatus of claim 11 wherein said fourth means further includes means for switching said control state means from said sixth one of said states to a seventh one of said states for generating signals for transferring additional portions of said predetermined one of said second type of instructions to said second one of said stages together with a next descriptor strobe signal and for toggling said string pointer back to an initial state for continuing the cracking of instructions stored in one of said first and second string buffers which was currently in use.

13. A method for controlling the execution of instructions in a pipelined mode of operation by a pipelined processing unit comprising a number of serially connected pipeline stages, each stage for performing a different operation in the execution of an instruction received by said unit, said instruction being received by a first one of said stages in succession, said method comprising the steps of:
(a) generating a plurality of signals in response to each instruction received by a first one of said stages, said plurality of signals generated by said first one of said stages differing for each different type of instruction;
(b) generating a sequence of state signals representative of a number of machine states by said first one of said pipeline stages in response to said plurality of signals, said sequence of signals being determined in part by said plurality of signals;
(c) starting step (a) for each instruction at an initial one of said machine states and sequencing through other ones of said machine states in response to said plurality of signals defining instruction type and size; and,
(d) generating signals in response to said machine states designating said different operations to be performed by said first one and a second one of said pipeline stages for completing the execution of said instruction.

14. A method of controlling the execution of a plurality of different types of instructions of an instruction set in a pipelined mode of operation by a plurality of serially coupled stages of a pipeline processing unit, each stage for performing a different operation on each instruction received by said processing unit, said instructions being received in succession by a first one of said stages, said method comprising the steps of:
(a) generating a plurality of signals in response to each received instruction by said first one of said stages, said plurality of signals generated differing for each different type of instruction;
(b) generating a plurality of state signals by said first one of said stages, said plurality of state signals being representative of different machine states of said first one of said stages; and,
(c) causing individual different ones of said different machine states of step (b) to be generated according to instruction type for controlling one or both of said first one and a second one of said stages to execute said different operation for completing instruction decoding and execution of certain types of instructions jointly by said first one and said second one of said stages and successively by said first and second ones of said stages respectively with increased performance.

15. The method of claim 14 wherein aid method further includes the step of performing the decoding of each instruction of said instruction set by said first one of said stages when operating in a first one of said machine states.

16. The method of claim 15 wherein said first one of said machine state corresponds to state 0.

17. The method of claim 15 wherein said method further includes the step of switching from said first one of said machine states to second and third ones of said machine states respectively in response to said plurality of signals for executing said different operations required to complete the execution of instructions of a first type by said first and second ones of said stages.

18. The method of claim 17 wherein said first type of instructions are branch instructions and wherein said different operation executed by said first one of said stages corresponds to executing a first class of branch instruction only when in said second state and said different operation executed by said second one of said stages corresponds to executing a second class of branch instruction only when in said third state.

19. The method of claim 15 wherein said method further includes the steps of:
switching in response to said plurality of signals from said first one of said machine states to a fourth one of said machine states for decoding second types of instructions;
switching from said fourth one of said machine states to a fifth one of said machine states in response to said plurality of signals for decoding a predetermined one of said second types of instructions by said first and second ones of said stages; and,
fetching additional portions of said predetermined one of said instruction by said second one of said stages for decoding said first one of said stages.

20. The method of claim 19 wherein said predetermined one of said second types of instructions corresponds to an instruction which includes a remote data descriptor.

21. The method of claim 19 wherein said method further includes the steps of:
switching in response to said plurality of signals representative of instruction size from said fifth one of said states to a number of other states in succession as determined by said instruction size; and, fetching said additional portions of said predetermined one of said second type of instructions.

22. The method of claim 19 wherein said first one of said stages includes buffer storage having first and second string buffers and a string pointer for designating which of said string buffers is currently in use and wherein said step of switching from said fourth one of said states to said fifth one of said states includes the step of toggling said string pointer for enabling said additional portions of said predetermined one of said second type of instructions fetched from a remote memory location to be loaded into one of said first and second string buffers currently not in use for decoding by said first one of said stages.

23. The method of claim 22 further including the steps of switching from said fifth one of said states to a sixth one of said states for cracking one of said additional portions of said predetermined one of said instructions stored in said buffer not in use and transferring said one of said additional portions to said second one of said stages together with a next descriptor strobe signal.

24. The method of claim 23 further including the step of switching from said sixth one of said states to a seventh one of said states for transferring other portions of said predetermined one of said second type of instructions to said second one of said stages together with a next descriptor strobe signal and for toggling said string pointer back to an initial state for continuing cracking instructions stored in one of said first and second string buffers which was currently in use.

* * * * *